United States Patent [19]

Schultz

[11] Patent Number: 5,277,839
[45] Date of Patent: Jan. 11, 1994

[54] GUIDEPATH MATERIAL

[75] Inventor: Selwyn Schultz, Zeeland, Mich.

[73] Assignee: Litton Industrial Automation Automated Vehicles, Holland, Mich.

[21] Appl. No.: 892,961

[22] Filed: Jun. 3, 1992

[51] Int. Cl.$^5$ ............................................. C09K 11/06
[52] U.S. Cl. ........................... 252/301.24; 252/301.16; 252/301.21
[58] Field of Search ...................... 252/301.16, 301.34, 252/301.35, 301.24

[56] References Cited

U.S. PATENT DOCUMENTS

| | | | |
|---|---|---|---|
| 2,267,758 | 12/1941 | Sell | 252/301.16 |
| 3,066,105 | 11/1962 | McCafferty | 252/301.34 |
| 3,162,642 | 12/1964 | McCafferty | 252/301.16 |
| 3,491,106 | 1/1970 | Freyermuth | 252/301.16 |
| 3,647,812 | 3/1972 | Smith | 252/301.16 |
| 3,740,402 | 6/1973 | Cevasco | 252/301.16 |
| 4,365,967 | 12/1982 | Guth et al. | 252/301.35 |
| 4,548,609 | 10/1985 | Schone | 8/94.21 |
| 4,652,395 | 3/1987 | Marcina et al. | 252/301.16 |
| 4,707,297 | 11/1987 | Paske, Jr. et al. | 252/301.16 |

FOREIGN PATENT DOCUMENTS 0314350 5/1989 European Pat. Off. .
1070326 6/1967 United Kingdom .

Primary Examiner—Ellen M. McAvoy
Attorney, Agent, or Firm—Morris I. Pollack; Stewart L. Gitler

[57] ABSTRACT

A dispersion or solution of a fluorescent dye material which emits radiation for detection by automated guidance vehicles (AGV) including a sulfonated fluorescent dye solution in its acid state. The unique product forms a guidepath on a carpet which requires little or no maintenance. The product will cause no carpet discoloration or will it be affected by extended exposure to sunlight.

21 Claims, No Drawings

GUIDEPATH MATERIAL

FIELD OF THE INVENTION

The present invention relates to guidepath compositions, namely luminescent or fluorescent compositions, which are to be used in conjunction with Automated Guidance Vehicles (AGV). The carpet, when treated with the guidepath composition, luminesces with a green to yellow color when stimulated with ultraviolet light incorporated in an AGV's sensor head. Photocells in the sensor head detect the luminescent emission of the guidepath. Light filters are installed over the photocells to block out background luminescence which is usually blue in color.

The unique guidepath material of the present invention includes a sulfonated luminescent dye composition in its acid state. The sulfonated luminescent dye solution or dispersion when aqueous, has an adjusted pH below 4.0 and preferably below 2.0. When the sulfonated luminescent dye compound is incorporated into a non-aqueous fluid, the dye compound's sulfone groups are protonated. After application of the guidepath material onto a carpet substrate, the material will be unaffected by conventional alkaline carpet cleaning materials and, in addition, will not be discolored by exposure to ultraviolet radiation.

BACKGROUND OF THE INVENTION

A wide variety of automated guidance vehicles (AGV) have been developed, for use in an office or industrial environment to perform delivery or work operations. The AGV's track a luminescent guidepath. The guidepath luminesces with a green to yellow color when stimulated with an ultraviolet light incorporated in an AGV's sensor head.

Early versions of the guidepath used on a carpet were made from a fluorescent dye such as benzothiazole derivatives which were dissolved in a non-acidic toluene/methanol solution. This solution worked for light colored carpets such as tan or grey. However, the dye was removed by strong carpet cleaning detergents, and was destroyed by exposure to ultraviolet rays in sunlight.

A second type of carpet guidepath was developed which used toluene as a primary solvent, and again a non-acidic luminescent dye compound such as a benzothiazole derivative, which was not destroyed by sunlight. An acrylic polymer was incorporated into the guidepath formula to bind the dye to the carpet fibers. This guidepath wore away over a few months on most carpets and after repeated applications the material left an unsightly dark line on the surface of the carpet.

A third type of carpet guidepath material was disclosed in U.S. Pat. No. 4,707,297. The neutral to basic material included a fluorescent dye or pigment dispersed in water combined with an acrylic resin crosslinked with zinc or zirconium ions. The guidepath was not visible on carpet and was removable with solutions like ammonia in water. A carpet guidepath made by this method wears away over a three to six month period. This guidepath will also be removed by cleaning with alkaline carpet shampoos.

Alternative systems have been utilized wherein magnetic tapes are being installed beneath the carpet. These systems require no maintenance for the guidepath, however they must be installed before the carpet is put down.

Various other neutral to basic water soluble dyes such as benzothiazole derivatives like sodium 3-(2-benzothiazolyl)-4-hydroxybenzene-sulfonate have been produced and used for guidepaths. The fluorescent emission of these dyes was shifted from green to blue when exposed to these alkaline cleaning materials commonly used in carpet maintenance. The material was also susceptible to discoloration and loss of brightness when exposed to ultraviolet light. Further, the guidepath material's fluorescent emission was not bright enough to be tracked reliably on dark colored carpets.

The present invention provides a guidepath solution of sulfonated luminescent dyes which when applied to carpet in an acid state form a permanent bond between the carpet fiber and the dye. When used in an aqueous solution, the guidepath solution has an adjusted pH below 4.0 and preferably below 2.0. When used in a non-aqueous solution, the acidic dye compound has sulfone groups which are protonated. These compounds luminesce more efficiently, are not affected by conventional alkaline cleaning materials and are not discolored by exposure to ultraviolet radiation.

SUMMARY OF THE INVENTION

The guidepath composition of the present invention includes a sulfonated luminescent dye in an acid state.

The unique guidepath material for detection of emitted radiation by AGV's will not be affected by conventional alkaline cleaning materials nor will it be discolored by exposure to ultraviolet radiation.

It is a further object of the present invention to produce a guidepath which is invisible under normal lighting conditions, and luminesces with a bright green or yellow emission when illuminated with an ultraviolet lamp. Such an emission will allow detection by an AGV sensor head at wavelengths distinct and separate from those of background emissions.

It is a further object of the present invention to utilize carrier solvents which will not be harmful to carpet fiber or backing materials.

Still another object of the present invention is to provide a guidepath material where solvent odor is minimal, and where no respiratory protection is required during the application of the product.

The above and other objects and advantages of the present invention will become apparent from the following detailed description of the preferred embodiments.

DETAILED DESCRIPTION OF THE PREFERRED EMBODIMENTS

In accordance with the present invention, a guidepath composition, which emits radiation for detection by automated guidance vehicles, which comprises a dispersion or solution of a sulfonated luminescent dye in its acid state. The aqueous dye solution has an adjusted pH below 4.0 and preferably below 2.0. When the dye is dissolved in a non-aqueous solution, the dye compound has sulfone groups which are protonated. Automated guidance vehicles detect luminescent emissions from guidepath materials by using an ultraviolet light source. Photocell sensors on the AGV guide the vehicle along a predetermined path.

To achieve full advantage of the guidepath compositions, a preferred embodiment of the present invention is disclosed as follows: a preferred guidepath dispersion or solution phase includes an aqueous solution or dispersion of a sulfonated luminescent dye compound; a solvent such as water, ethanol, methanol, propanol and/or isopropanol; a pH adjustor; and a surface active agent to improve penetration such as Triton Gr-5M from Union Carbide (wetting agent). The sulfonated luminescent dye is capable of absorbing ultraviolet light and emitting radiation which can be detected by the photocell sensors on the AGV. The emissions can be detected at preferred wavelengths thereby allowing separation from background emissions.

Luminescent solutions which include dye compounds which are sulfonated and contained in an aqueous guidepath solution, display an adjusted pH below 4.0 and preferably below 2.0. The sulfonated luminescent dye material will form a permanent bond with the carpet fiber or backing due to an interaction between the sulfonic acid groups present and the amide functional groups contained in the carpet.

A suitable luminescent dye which serves the basis of the guidepath composition is 2-(5-benzamido-3-benzoyl-2-hydroxyphenyl) benzoxazole. To produce this desired compound, 2-(5-amino-2-hydroxyphenyl) benzoxazole is dissolved in pyridine. The benzoxazole compound can be produced in a variety of ways (see U.S. Pat. No. 3,162,642). Benzoyl chloride is added in a ratio of 2 molar equivalents of the benzoyl chloride to one molar equivalent of the benzoxazole, over several minutes, and kept at a temperature equal to 20°-25° C. The mixture is concurrently stirred during which the product precipitates out of solution resulting in a slurry. The slurry is then mixed with water and filtered. The filter cake is washed with distilled water and methanol. The product is then dried at 100° C. for 16 hours. The resultant product [2-(5-benzamido-3-benzoyl-2-hydroxyphenyl) benzoxazole] is white in color and luminesces with a bright yellow-green emission.

The prepared dye is then sulfonated. The dye material, produced above, was added over a short, 15 minute, period to fuming sulfuric acid. The mixture is initially cooled with an ice bath. After 16 hours, the mixture is poured over ice. A light yellow precipitate is formed and is separated from the water by vacuum filtration. The filter cake is washed with ice water. The material is then dried at 100° C. for 16 hours to form the sulfonated 2-(5-benzamido-3-benzoyl-2-hydroxyphenyl) benzoxazole (see U.S. Pat. No. 3,491,106).

A solution of 1% by weight of the dye was prepared using distilled water as the solvent. To this solution is added a small amount of a wetting agent. The pH of the solution is adjusted to below 4.0 preferably below 2.0 by the addition of concentrated hydrochloric acid. A stripe of the resultant solution was applied to a grey cut pile nylon carpet with a white felt roller pad. After drying overnight, the stripe was not visible under white light. When illuminated with an ultraviolet lamp the guidepath stripe luminesced with an intense yellow-green color.

The carpet with the test stripe was exposed to ultraviolet radiation for 100 hours. A portion of the stripe was covered to prevent exposure. At the end of the test period there was no noticeable difference between the exposed portion of the test stripe and the portion that had been covered.

The carpet with the test stripe was then scrubbed with a conventional carpet cleaning solution, pH 10.5. After scrubbing, the cleaning solution was extracted with a wet vacuum. After drying the stripe of luminescent dye, the stripe was not visible under white light, and no change in its luminescent properties was observed when it was illuminated with an ultraviolet light.

Another suitable acidic fluorescent dye compound which serves the basis of the guidepath composition is 2-(5-(p-fluorobenzamido)-3-(p-fluorobenzoyl)-2-hydroxyphenyl) benzoxazole. To produce this compound, a process identical to the process discussed above is employed with 4-fluorobenzoyl chloride being substituted for benzoyl chloride.

Sulfonation is also performed as previously described. However, the sulfonated molecule is only slightly soluble in water in its acid state.

Production of the guidepath from the sulfonated 2-(5-p-fluorobenzamido-3-(p-fluorobenzoyl)-2-hydroxyphenyl)benzoxazole requires the use of a solvent mixture of 50% methanol and 50% water. The sulfonated product is first mixed with water, and the pH of the mixture is adjusted to below 4 (preferably 2.0). After the pH adjustment, the methanol is added and the dye fully dissolves.

A solution which was 1% by weight of the dye was prepared in the above-described manner. The dye was tested by applying a stripe of the material to a red-orange, nylon fiber, cut pile carpet. After drying, the line was invisible under white light. When illuminated under ultraviolet light, the stripe luminesced with a strong yellow emission. Other guidepath materials are not readily detectable by an AGV on a red-orange carpet. This guidepath was easily detected on this carpet by an AGV equipped to detect luminescent guidepaths. The guidepath was unaffected by scrubbing with a conventional carpet cleaning solution, such as CONTEMPO V from Spartan Chemical. One hundred hours of exposure to ultraviolet radiation did not affect the appearance of the guidepath or the intensity of its luminescent emission.

Other benzoxazole derivatives such as 2-(5-benzamido-2-hydroxyphenyl) benzoxazole; and 2-(5-(p-fluorobenzamido)-2-hydroxyphenyl) benzoxazole are synthesizable by similar methods and are usable, when sulfonated and incorporated into a solution with an adjusted pH below 4.0, preferably 2.0, for the present invention.

It should be understood that the present disclosure has been made by way of a preferred embodiment and that numerous changes in details of construction, combination and arrangement of parts may be resorted to without departing from the spirit and scope of the invention.

What is claimed is:

1. A guidepath composition which forms a permanent bond between a carpet and said composition and emits radiation for detection by automated guidance vehicles comprising a dispersion or solution of a luminescent dye compound in its acid state.

2. A guidepath composition which forms a permanent bond between a carpet and said composition and emits radiation for detection by automated guidance vehicles in accordance with claim 1, wherein said dispersion or solution is aqueous with an adjusted pH below 4.0.

3. A guidepath composition which forms a permanent bond between a carpet and said composition and emits radiation for detection by automated guidance vehicles in accordance with claim 2, wherein said adjusted pH of said dispersion is below 2.0.

4. A guidepath composition which forms a permanent bond between a carpet and said composition and emits radiation for detection by automated guidance vehicles in accordance with claim 2, wherein said luminescent dye compound is sulfonated.

5. A guidepath composition which forms a permanent bond between a carpet and said composition and emits radiation for detection by automated guidance vehicles in accordance with claim 4, wherein said sulfonated luminescent dye compound is dissolved in a solvent selected from the group consisting of water, ethanol, methanol, propanol, isopropanol and mixtures thereof.

6. A guidepath composition which forms a permanent bond between a carpet and said composition and emits radiation for detection by automated guidance vehicles in accordance with claim 4, further comprising a surface active agent.

7. A guidepath composition which forms a permanent bond between a carpet and said composition and emits radiation for detection by automated guidance vehicles in accordance with claim 4, further comprising a pH adjuster selected from the group consisting of hydrochloric acid, methane sulfonic acid, sulfuric acid and phosphoric acid.

8. A guidepath composition which forms a permanent bond between a carpet and said composition and emits radiation for detection by automated guidance vehicles in accordance with claim 4, wherein said dye compound is 2-(5-benzamido-3-benzoyl-2-hydroxyphenyl) benzoxazole, 2-(5-(p-fluorobenzamido)-3-(p-fluorobenzoyl)-2-hydroxyphenyl) benzoxazole, 2-(5-benzamido-2-hydroxyphenyl) benzoxazole or mixtures thereof.

9. A guidepath composition which forms a permanent bond between a carpet and said composition and emits radiation for detection by automated guidance vehicles comprising an aqueous dispersion or solution of a sulfonated luminescent dye compound having an adjusted pH below 4.0.

10. A guidepath composition which forms a permanent bond between a carpet and said composition and emits radiation for detection by automated guidance vehicles in accordance with claim 9, wherein said adjusted pH is below 2.0.

11. A guidepath composition which forms a permanent bond between a carpet and said composition and emits radiation for detection by automated guidance vehicles in accordance with claim 10, wherein said luminescent dye is 2-(5-benzamido-3-benzoyl-2-hydroxyphenyl) benzoxazole.

12. A guidepath composition which forms a permanent bond between a carpet and said composition and emits radiation for detection by automated guidance vehicles in accordance with claim 11, wherein said dye is dissolved in a water solvent.

13. A guidepath composition which forms a permanent bond between a carpet and said composition and emits radiation for detection by automated guidance vehicles in accordance with claim 12 further comprising a surface active agent.

14. A guidepath composition which forms a permanent bond between a carpet and said composition and emits radiation for detection by automated guidance vehicles in accordance with claim 13, wherein said pH is adjusted with hydrochloric acid.

15. A guidepath composition which forms a permanent bond between a carpet and said composition and emits radiation for detection by automated guidance vehicles in accordance with claim 10, wherein said luminescent dye is 2-(5-(p-fluorobenzamido)-3-(p-fluorobenzoyl)-2-hydroxyphenyl)benzoxazole.

16. A guidepath composition which forms a permanent bond between a carpet and said composition and emits radiation for detection by automated guidance vehicles in accordance with claim 15 wherein said dye is dissolved in a methanol water solvent mixture.

17. A method of producing a guidepath composition which forms a permanent bond between a carpet and said composition, for application to a carpet, as claimed in claim 14, comprising the steps of:
 a) sulfonating said dye material;
 b) dissolving said sulfonated dye material in a distilled water solvent to form a solution;
 c) adding a surface active agent to said solution; and
 d) adjusting said pH of said solution to a pH below 4.0 by addition of an acid.

18. A method of producing a guidepath composition which forms a permanent bond between a carpet and said composition, for application to a carpet, in accordance with claim 17, wherein said pH is adjusted to below 2.0.

19. A method of producing a guidepath composition which forms a permanent bond between a carpet and said composition, for application to a carpet, as claimed in claim 16, comprising the steps of:
 a) sulfonating said dye material;
 b) partially dissolving said dye material in a distilled water solvent to form a dye solution;
 c) adjusting the pH of the dye solution to a pH below 4.0 by addition of an acid; and
 d) fully dissolving said dye solution by addition of a methanol solvent.

20. A method of producing a guidepath composition which forms a permanent bond between a carpet and said composition, for application to a carpet, in accordance with claim 19, wherein said pH is adjusted to below 2.0.

21. A guidepath composition which forms a permanent bond between a carpet and said composition and emits radiation for detection by automated guidance vehicles in accordance with claim 1, wherein said dispersion or solution is non-aqueous and wherein the dye compound has sulfone groups which are protonated.

* * * * *